Patented Mar. 15, 1927.

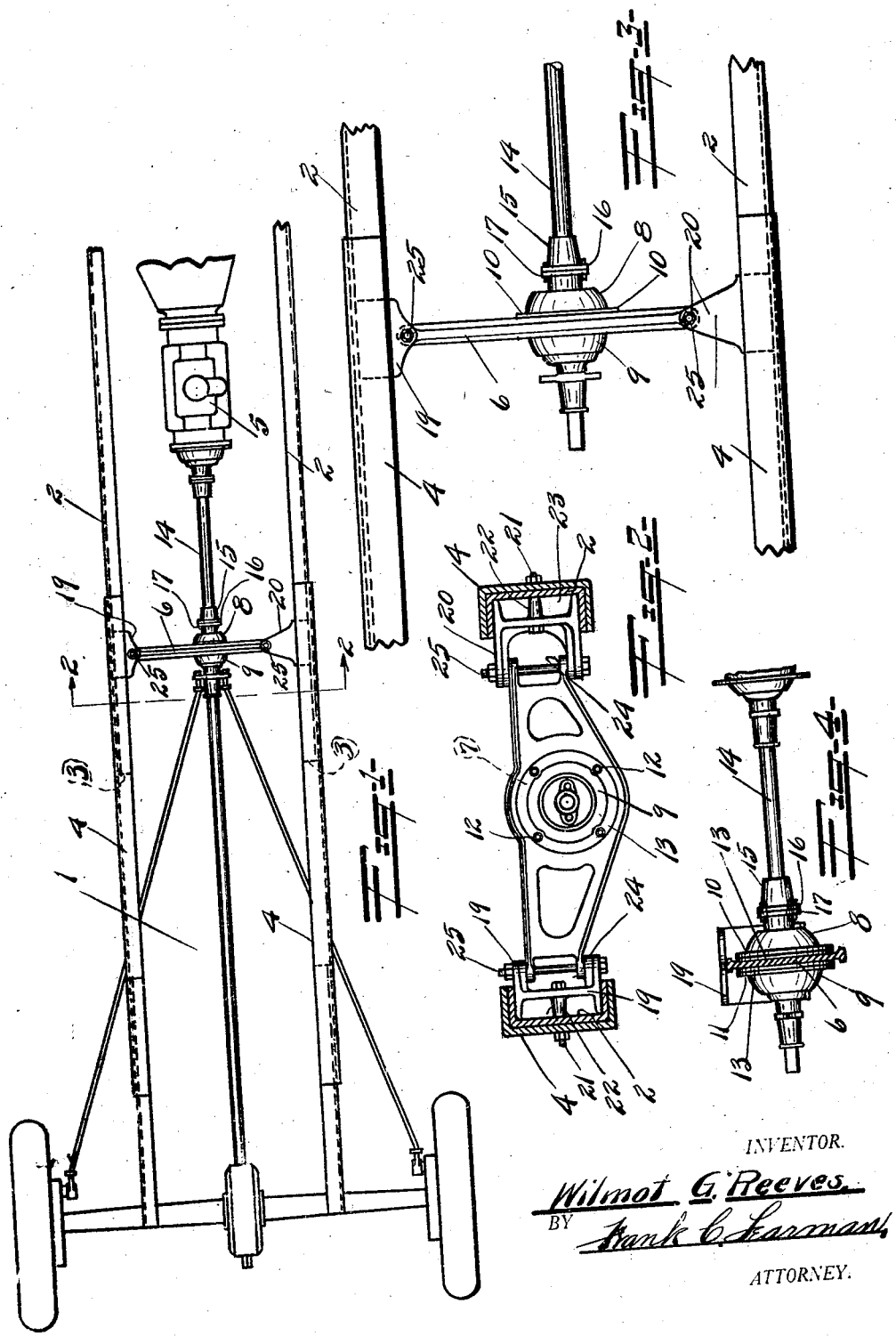

1,621,275

UNITED STATES PATENT OFFICE.

WILMOT G. REEVES, OF STOCKBRIDGE, MICHIGAN.

EXTENSION UNIT.

Application filed June 20, 1925. Serial No. 38,572.

This invention relates to devices for lengthening the chassis and driving connections of an automotive vehicle to permit of the vehicle carrying a larger body to accommodate a larger and more bulky load, without the load overhanging the rear axle to the extent that the axle and other mechanism is subjected to unusual stresses and strains, other than for which they were designed.

One object of the invention is to design an extension unit which will reinforce and strengthen the lengthened frame, and permit of larger and more bulky loads.

Another object is to design an extension unit and cross member which will absorb the torque now transmitted to the motor and which will insure perfect and positive alignment of the drive shaft under all road conditions.

A further object is to design an extension unit and cross member in which the universal joint is mounted in the cross member and which will eliminate all misalignment between the cross member and motor.

With the above and other objects in view, the present invention consists in the combination and arrangement of parts, hereinafter more fully described, illustrated in the accompanying drawing, and particularly pointed out in the appended claims, it being fully understood that changes may be made in the form, size, proportion, and minor details of construction, without departing from the spirit, or sacrificing any of the advantages of the invention.

In the drawing—

Fig. 1 is a fragmentary top plan view of an extended chassis with my improvement extension unit in place thereon.

Fig. 2 is an enlarged end view taken on the line 2—2 of Fig. 1, and looking in the direction of the arrows.

Fig. 3 is an enlarged fragmentary top plan view of the frame and cross member.

Fig. 4 is a fragmentary part sectional view of the cross member showing the universal joint mounted therein.

Referring now particularly to the drawing in which I have shown the preferred embodiment of my invention, the numeral 1 indicates a conventional "Ford" chassis having a frame 2, which is cut as shown at 3 and extended by means of a pair of extension members 4 fitted to each side and secured in place by means of bolts or the like.

As shown in the present instance the device is attached to a "Ford" chassis and an auxiliary transmission 5 is interposed between the conventional Ford transmission and the rear axle, which provides for a wider range of speed. This is however immaterial insofar as this case is concerned and is for explanatory purposes only as this application is directed to the extension unit and cross member proper.

The cross member proper comprises a casting 6 formed as clearly shown in Fig. 2 of the drawing, having a centrally disposed opening 7 in which a conventional universal joint is mounted, spherical housings 8 and 9 respectively, are provided on opposite sides of said cross member, and are formed with flanges 10 and 11 having openings therein, and through which bolts 12 are extended for rigidly clamping said housing to said cross member, gaskets 13 being interposed between the flanges and the member to make a dirt and dust proof connection thereat. A short section of drive shaft 14 is secured to the coupling 15 which is in turn bolted to the flange 16 cast integral with the spherical housing 8, the opposite end being secured to a coupling 17 formed integral with the spherical housing 18 which is attached to the auxiliary transmission 5.

Preferably cast block members 19 and 20 are secured to the side frame members by means of bolts 21 which extend through a boss 22 cast integral therewith, and these are formed similar to an I-beam section excepting, that the flange on the top and bottom extends outwardly and is provided with bolt receiving openings therein, a block of wood or similar material 23 being interposed between the frame member and the web of the block for providing a rigid connection.

The ends of the cross member 6 are formed with spaced apart ears 24 which are provided with bolt receiving openings therein, and when the cross member is in assembled position, these openings are in direct vertical alignment with the openings in the block members 19 and 20, a bolt 25 being inserted therein, and a nut threaded thereon.

This unit eliminates all misalignment between the cross member and vehicle motor, and relieves the strain thereon, it also takes the thrust from the rear through the propeller shaft, and the torque which is usually transmitted to the motor through the auxiliary transmission.

From the foregoing description it will be obvious that I have perfected a very simple, substantial and effective extension unit for Fords and similar vehicles.

What I claim is:—

1. In an automobile, the combination with the side members of a chassis, blocks of I-beam cross section fitted in said side members and provided with centrally disposed bosses adapted to engage the web of the side members, and bolts extending through said bosses for securing said blocks to the frame, a cross member pivotally secured to said blocks and provided with a centrally disposed opening, spherical housings on each side of said housing, gaskets interposed between the housing and the cross member, and a universal joint mounted in said housings.

2. In an automobile, the combination with the side members of a chassis, block members of I-beam cross section fitted in and secured thereto, a cross member pivotally secured to said block member and provided with a centrally disposed opening, spherical shaped housings on each side of the cross member, gaskets interposed between said housings and cross member to form a dust proof joint, a universal joint mounted therein, and means for rigidly clamping the said housing to the cross member.

In testimony whereof I affix my signature.

WILMOT G. REEVES.